E. PAGE.
Churn.
No. 19,310.
Patented Feb. 9, 1858.
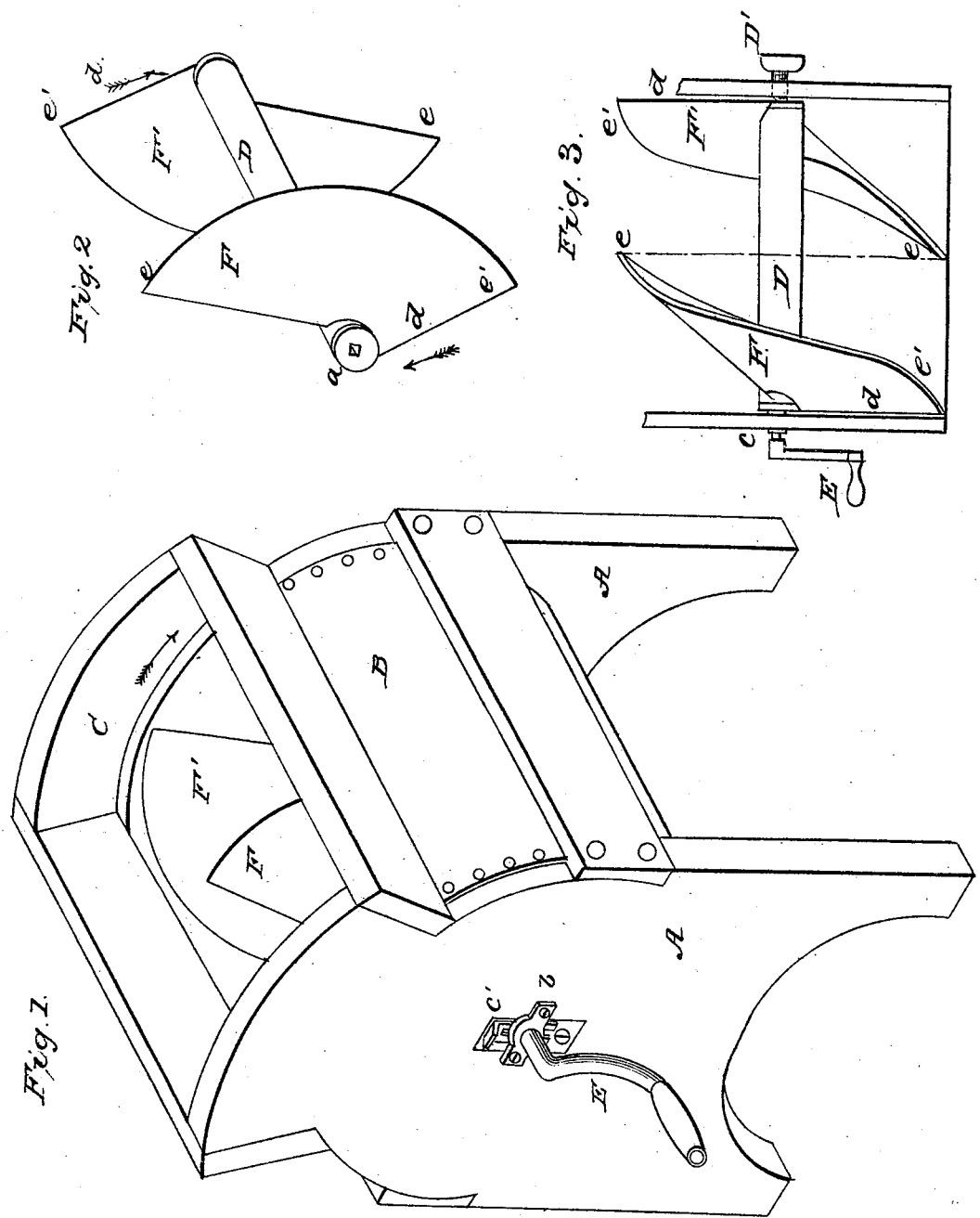

UNITED STATES PATENT OFFICE.

ENOS PAGE, OF STREETSBORO, OHIO.

CHURN.

Specification of Letters Patent No. 19,310, dated February 9, 1858.

*To all whom it may concern:*

Be it known that I, ENOS PAGE, of Streetsboro, in the county of Portage and State of Ohio, have invented new and useful Impovements in Churns; and I do hereby declare that the following is a full and exact description of the construction and operation of the same, reference being had to accompanying drawings, making a part of this specification, in which—

Figure 1 is a perspective view, and Figs. 2 and 3 different views of the wings or dashers.

Like letters refer to like parts.

The body of the churn may be made in the usual form and manner, having board ends, which are straight and vertical, and are seen at A, A, Fig. 1. These end pieces extend downward, to form the legs. The body B, is cylindrical, and may be made of zinc or other sheet metal, and nailed or riveted to the end pieces in the manner represented. The top is formed into a curb, as seen at C, which can be closed with a cover, having the same internal curve as the body of the churn. The wings or dashers are attached to the horizontal shaft D, seen in Figs. 2 and 3. This shaft is sustained and kept in place at the end D', by a thumb screw, passing through the end of the churn body. The other end of the shaft is supported by the crank E, Figs. 1 and 3. The end of the crank shaft is square and fits into a square hole in the end of the shaft, seen at $a$ Fig. 2. The crank shaft, where it passes through the end board of the body of the churn, is supported by the bearing $b$, the shaft being provided with a groove $c$, and collar $c'$ seen in Figs. 1 and 3, by which it is made tight from leakage and also secured from getting out of place while at work. The shaft with its wings can be removed at pleasure by disengaging the collar $c'$.

The wings or dashers, F and F' are two in number and are in form, like the half of a spiral disk, and are seen in Figs. 2 and 3. The wings are also seen in part, in Fig. 1. The direction in which they turn, is indicated by the arrow. These wings are spirally formed; the forward edge $d$, of each, sweeping at every revolution, the end of the churn barrel; the circumference of each of the spiral disks, seen from $e$ to $e'$, at the same time, sweeping one half of the length of the churn body. The two wings, F and F', having their spiral curves in opposite directions, or right and left, as seen in Figs. 2 and 3, being placed upon opposite sides of the shaft D, at every revolution of the shaft and wings, causes the milk or cream in the churn, to move suddenly from the end, toward, and past the center of the body of the churn, and by the continuous revolution of the shaft, the cream is dashed with rapidity from end to end of the churn, causing a separation of the butter from the milk. A backward turn of the crank occasionally, will remove the adhering cream from the back surfaces of the wings.

When the butter has separated from the milk, a slow or moderate motion will gather the butter into a solid ball. When the operation is completed, the shaft and wings can be removed by disengaging the crank, as before described.

The distinguishing features of my invention, consist in the peculiar form of the wings or dashers, the edges $d$, $d$, standing at right angles to the shaft, so that they may sweep the ends of the churn barrel; the dashers F and F', being spiral in opposite directions, or reverse to each other, the spiral edges $e$ and $e'$ of both, sweeping the length of the body of the churn (each one half way); and placing these wings or dashers on opposite sides of the shaft, so that the whole of the cream or milk in the churn, is forced past the center at every revolution, into the track of the opposite dasher.

I do not claim the simple use of spiral dashers arranged so as to force the cream alternately in opposite directions, being aware that such is not new; but

What I claim as my invention and desire to secure by Letters Patent, is—

The arrangement of the spiral wing dashers F F', on opposite sides and ends of the dasher shaft, in combination with a cylindrical churn body in such a manner that the outer radial edges $d$, $d$, thereof shall respectively sweep (or move in close proximity to) the ends of the churn body, and their spiral edges $e$ $e'$, $e$ $e'$, sweep respectively one half the length of the periphery of the churn body, substantially in the manner and for the purpose herein specified.

ENOS PAGE.

Witnesses:
  GEO. F. DAILY,
  JESSE TASKER.